(12) United States Patent
Calago et al.

(10) Patent No.: US 11,679,625 B2
(45) Date of Patent: Jun. 20, 2023

(54) OFFSET EXTENDABLE AXLE WITH WHEELS ON COMMON CENTERLINE

(71) Applicants: ZOOMLION Heavy Industry NA, Inc., Yorkville, WI (US); ZOOMLION Heavy Industry Science and Technology Co. Ltd., Changsha Hunan Province (CN)

(72) Inventors: Edgar Calago, Lake Villa, IL (US); Matthew Schoenberg, Kenosha, WI (US); Erik Goslawski, Burlington, WI (US)

(73) Assignees: ZOOMLION HEAVY INDUSTRY N.A, INC., Yorkville, WI (US); ZOOMLION HEAVY INDUSTRY SCIENCE AND TECHNOLOGY CO LTD, Changsha Hunan Province (CN)

( * ) Notice: Subject to any disclaimer, the term of this patent is extended or adjusted under 35 U.S.C. 154(b) by 518 days.

(21) Appl. No.: 17/005,613

(22) Filed: Aug. 28, 2020

(65) Prior Publication Data

US 2022/0063331 A1 Mar. 3, 2022

(51) Int. Cl.
| | |
|---|---|
| *B60B 35/10* | (2006.01) |
| *B62D 7/14* | (2006.01) |
| *B60K 1/02* | (2006.01) |
| *B62D 7/18* | (2006.01) |
| *B60K 7/00* | (2006.01) |

(52) U.S. Cl.
CPC ............ *B60B 35/1054* (2013.01); *B60K 1/02* (2013.01); *B60K 7/0015* (2013.01); *B62D 7/142* (2013.01); *B62D 7/18* (2013.01)

(58) Field of Classification Search
CPC ... B60B 35/1054; B60B 35/109; B60B 35/14; B60B 35/163; B60K 1/02; B60K 7/0015; B60K 2007/0038; B60K 2007/0092; B60K 7/0007; B62D 7/142; B62D 7/18; B60Y 2200/43
See application file for complete search history.

(56) References Cited

U.S. PATENT DOCUMENTS

| | | | |
|---|---|---|---|
| 6,827,176 B2 | 12/2004 | Bean et al. | |
| 9,156,312 B1 * | 10/2015 | Ruggeri | ................ B60B 35/122 |
| 10,562,364 B2 * | 2/2020 | Crook | ................ B60G 17/0152 |
| 11,560,017 B2 * | 1/2023 | Langlitz | .............. B60B 35/1045 |

* cited by examiner

*Primary Examiner* — Kevin Hurley
*Assistant Examiner* — Marlon A Arce
(74) *Attorney, Agent, or Firm* — Donald J. Ersler

(57) ABSTRACT

An extendable axle with wheels on a common centerline preferably includes a base housing, a left axle device, a right axle device, a left extension cylinder and a right extension cylinder. The left axle device slides into a left side of the base housing and the right axle device slides into a right side of the base housing. The left axle device preferably includes a base tube, a steering knuckle, a drive motor and a steering cylinder. The steering knuckle is pivotally engaged with an end of the base tube. The drive motor is retained on the steering knuckle. The steering cylinder pivots the steering knuckle. The right axle device is the left axle device rotated 180 degrees. The left extension cylinder extends the left axle device. The right extension cylinder extends the right axle device. The left drive motor and the right drive motor are on the same centerline.

12 Claims, 6 Drawing Sheets

OFFSET EXTENDABLE AXLE WITH WHEELS ON COMMON CENTERLINE

BACKGROUND OF THE INVENTION

1. Field of the Invention

The present invention relates generally to heavy equipment and more specifically to an offset extendable axle with wheels on a common centerline for a mobile equipment work platform (MEWP).

2. Discussion of the Prior Art

U.S. Pat. No. 6,827,176 to Bean et al. (Bean) discloses a vehicle with offset extendible axles and independent four-wheel steering control. However, the Bean patent discloses that left and right front and rear wheels are not on the same centerline. The advantage of having left and right wheels on the same centerline are an improvement to machine steering; the wheels will not drag each other; a synchronizing control system will be less complicated; and wheels will engage a trailer ramp at the same time to improve on loading and offloading.

Accordingly, there is a clearly felt need in the art for an offset extendable axle with wheels on a common centerline for a mobile equipment work platform (MEWP), which provides an improvement to machine steering; the wheels not dragging relative to each other; a less complicated synchronizing control system; and the wheels engaging a trailer ramp at the same time to improve on loading and offloading.

SUMMARY OF THE INVENTION

The present invention provides an offset extendable axle with wheels on a common centerline for mobile equipment work platform (MEWP) applications. The extendable axle with wheels on a common centerline (offset extendable axle) preferably includes a base housing, a left axle device, a right axle device, a left extension cylinder and a right extension cylinder. The base housing includes a middle plate, a right axle opening and a left axle opening. The middle plate extends a length of the base housing. The right axle opening is formed through a right side of the base housing and in front of the middle plate. The left axle opening is formed a left side of the base housing and behind the middle plate. Right side wear pads are preferably located on an inner perimeter of the right axle opening. Left side wear pads are preferably located on an inner perimeter of the left axle opening. The left axle device preferably includes a base tube, a steering knuckle, a drive motor and a steering cylinder. The base tube includes a bottom plate, a top plate, a front plate and a rear plate. The left axle device is rotated 180 degrees to create the right axle device.

A carrier pivot extension extends frontward from an end of the bottom plate and the top plate. A bottom of the rear plate is attached to a top and rear of the bottom plate. A bottom and rear of the top plate is attached to a top of the rear plate. A bottom of the front plate is attached to a top and front of the bottom plate. A bottom and front of the top plate is attached to a top of the front plate. The steering knuckle includes a top pivot flange, a bottom pivot flange and a motor plate. The top pivot flange extends inward from a top of an inside surface of the motor plate. The bottom pivot flange extends inward from a bottom of an inside surface of the motor plate. A front of the top and bottom pivot flanges are pivotally engaged with the top and bottom carrier pivot extensions. One end of the steering cylinder is pivotally retained on an inside surface of the front plate. An opposing end of the steering cylinder is pivotally engaged with a rear of the top pivot flange. One end of the left extension cylinder is attached to a rear of the middle plate at a right end and opposing end of the left extension cylinder is attached to a front plate, adjacent the carrier pivot extensions. One end of the right extension cylinder is attached to a front of the middle plate at a left end and opposing end of the right extension cylinder is attached to the front plate (before rotation), adjacent the carrier pivot extensions.

Accordingly, it is an object of the present invention to provide an offset extendable axle with wheels on a common centerline for a mobile equipment work platform (MEWP), which provides an improvement to machine steering; the wheels not dragging each other; a less complicated synchronizing control system; and the wheels engaging a trailer ramp at the same time to improve on loading and offloading.

These and additional objects, advantages, features and benefits of the present invention will become apparent from the following specification.

DETAILED DESCRIPTION OF THE PREFERRED EMBODIMENTS

Figure 1:
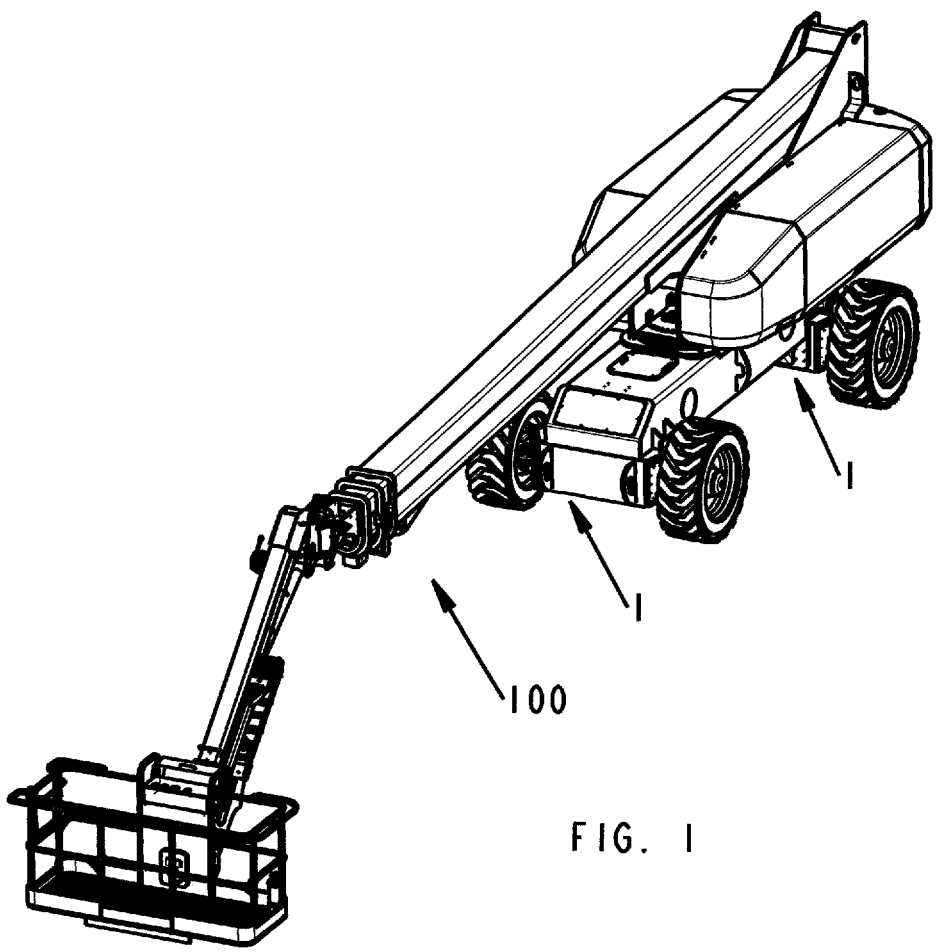
FIG. 1 is a perspective view of a MEWP with a pair of offset extendable axles in a retracted position in accordance with the present invention.
Figure 2:
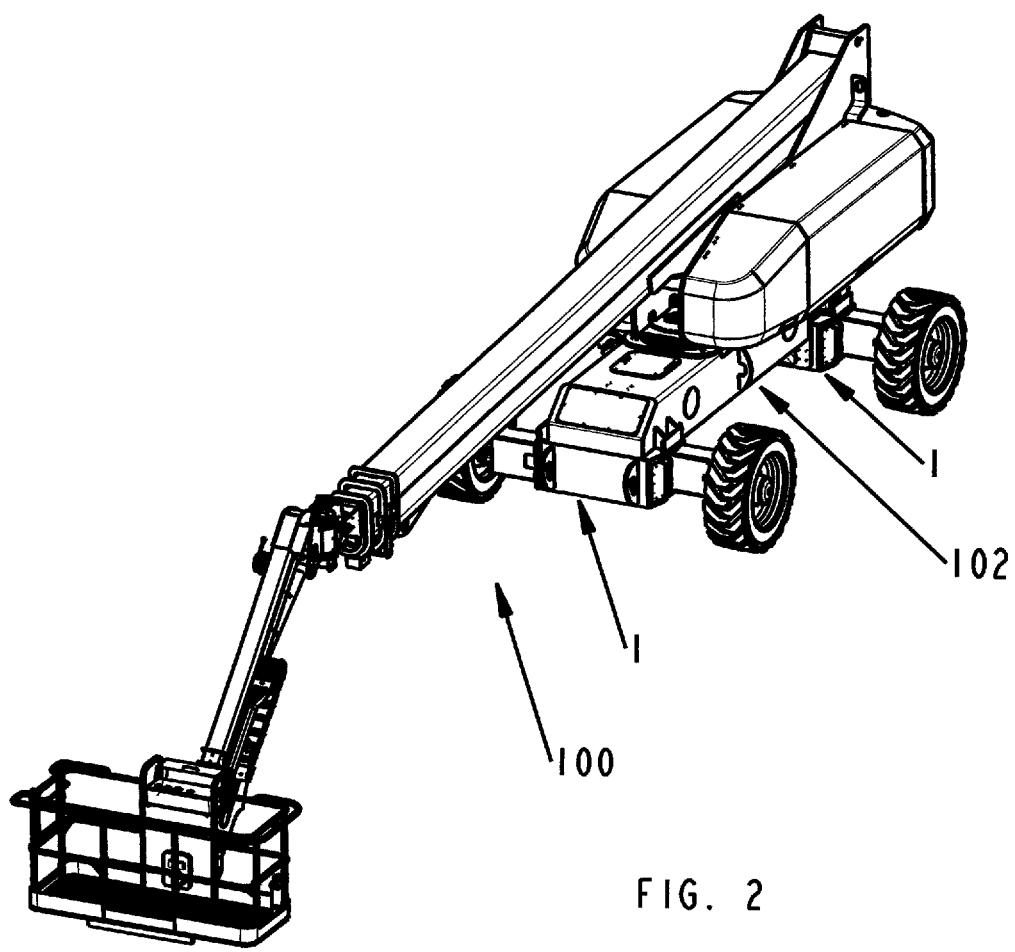
FIG. 2 is a perspective view of a MEWP with a pair of offset extendable axles in an extended position in accordance with the present invention.
Figure 3:
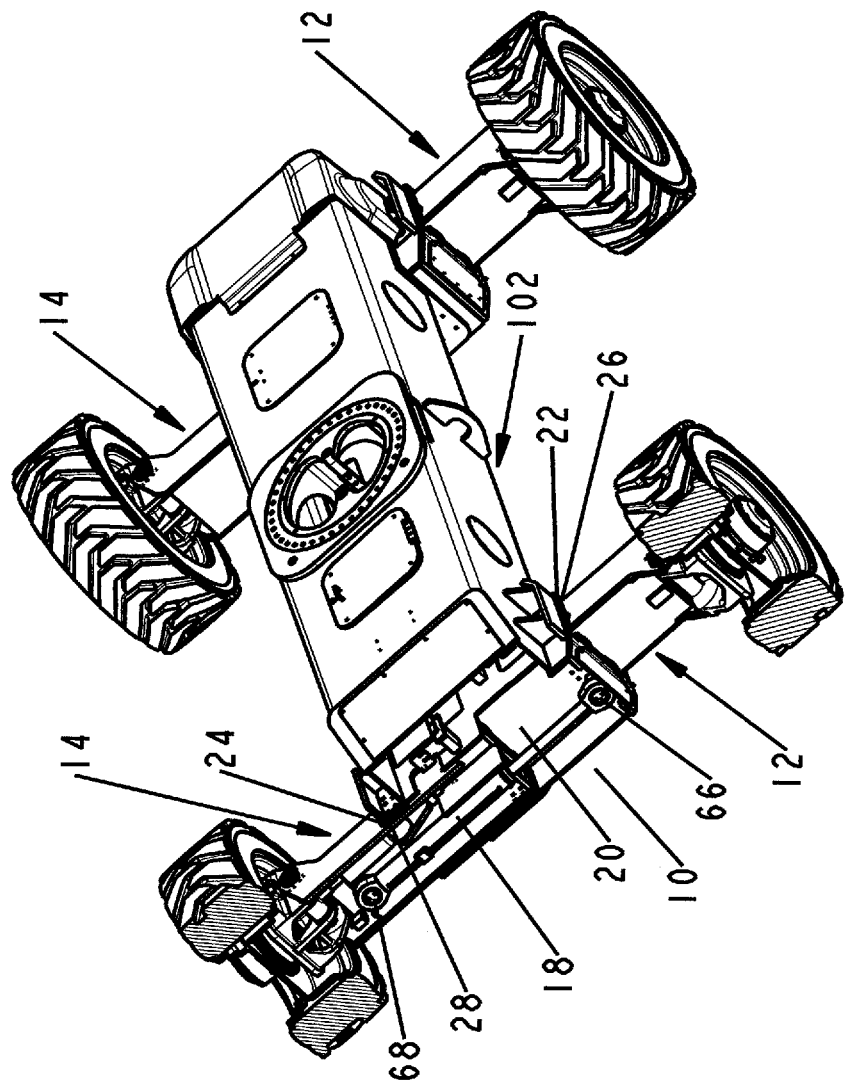
FIG. 3 is a perspective view of a MEWP Chassis with a pair of offset extendable axles in an extended position in accordance with the present invention.
Figure 4:
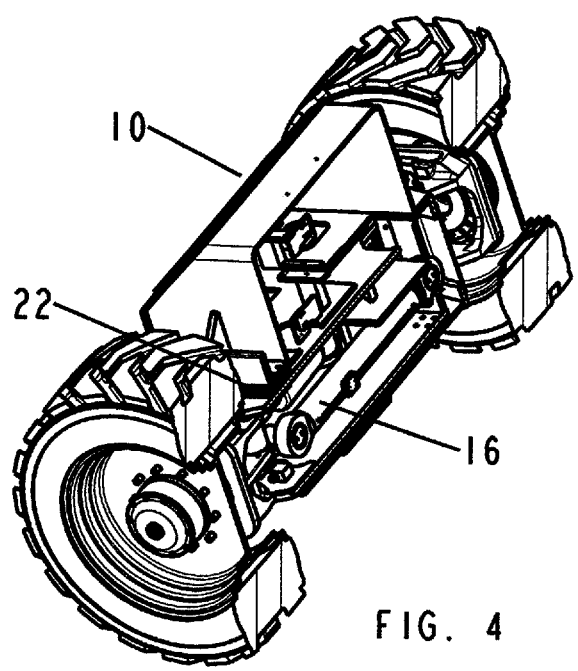
FIG. 4 is a perspective view of an offset extendable axle in a retracted position with a rear cover plate removed in accordance with the present invention.
Figure 5:
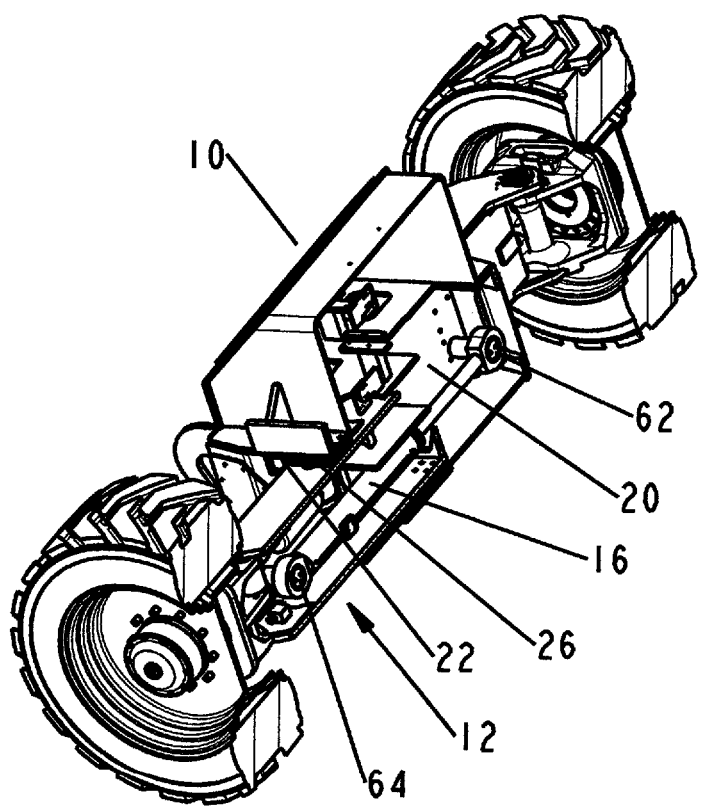
FIG. 5 is a perspective view of an offset extendable axle with a left axle device extended and a right axle device retracted with a rear cover plate removed in accordance with the present invention.
Figure 6:
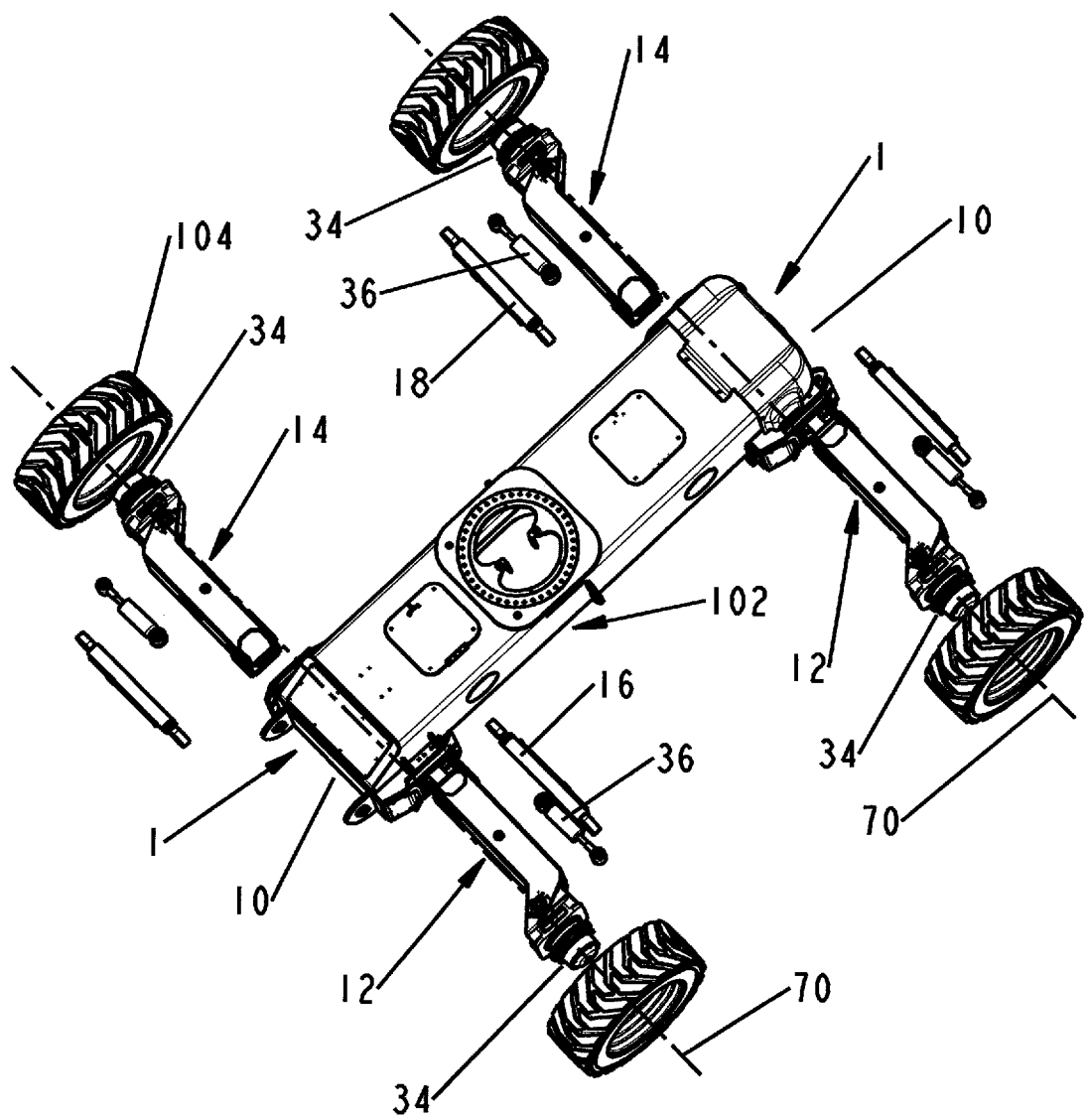
FIG. 6 is a partially exploded perspective view of a MEWP Chassis with a pair of offset extendable axles in accordance with the present invention.
Figure 7:
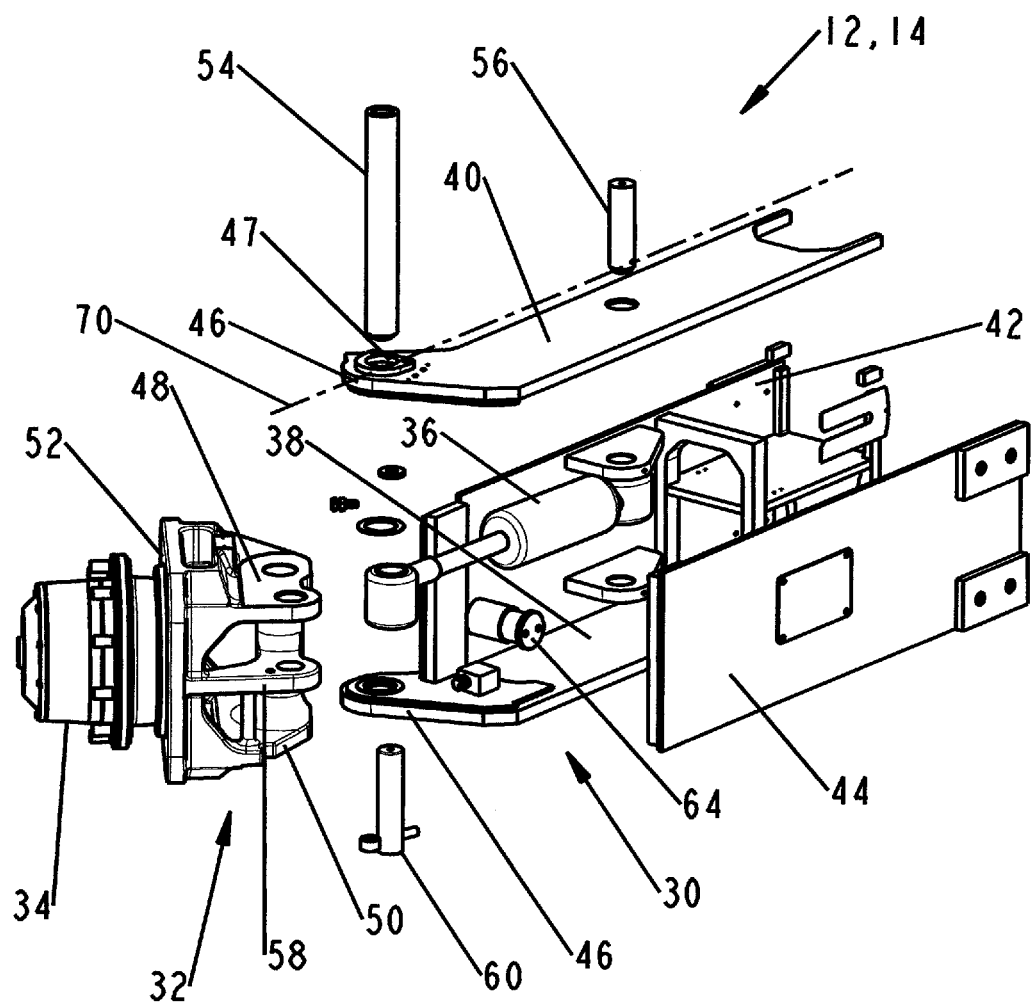
FIG. 7 is a partially exploded perspective view of an offset extendable axle in accordance with the present invention.

With reference now to the drawings, and particularly to FIG. 1, there is shown a perspective view of a MEWP platform 100 with a pair of offset extendable axles 1 in a retracted position. FIG. 2 is a perspective view of the MEWP 100 with a pair of offset extendable axles 1 in an extended position in accordance with the present invention. The MEWP 100 also includes a MEWP Chassis 102. With reference to FIGS. 3-5, the offset extendable axle 1 preferably includes a base housing 10, a left axle device 12, a right axle device 14, a left extension cylinder 16 and a right extension cylinder 18. The base housing 10 includes a middle plate 20, a left axle opening 22 and a right axle opening 24. The middle plate 20 extends a length of the base housing 10. The right axle opening 24 is formed through a right side of the base housing and in front of the middle plate 20. The left axle opening 22 is formed through a left side of the base housing 10 and behind the middle plate 20. Left side wear pads 26 are preferably located on an inner perimeter of the left axle opening 22. Right side wear pads 28 are preferably located on an inner perimeter of the right axle opening 24. With reference to FIGS. 6-7, the left axle device 12 preferably includes a base tube 30, a steering knuckle 32, a drive motor 34 and a steering cylinder 36. The base tube 30 includes a bottom plate 38, a top plate 40, a front plate 42 and a rear plate 44. The left axle device 12 is rotated 180 degrees to create the right axle device 14. A wheel 104 is retained on said drive motor 34.

A carrier pivot extension 46 extends frontward from an end of the bottom plate 38 and the top plate 40. A bottom of the rear plate 44 is attached to a top and rear of the bottom plate 38. A bottom and rear of the top plate 40 is attached to a top of the rear plate 44. A bottom of the front plate 42 is attached to a top and front of the bottom plate 38. A bottom and front of the top plate 40 is attached to a top of the front plate 42. The steering knuckle 32 includes a top pivot flange 48, a bottom pivot 50 flange and a motor plate 52. The top pivot flange 48 extends inward from a top of an inside surface of the motor plate 52. The bottom pivot flange 50 extends inward from a bottom of an inside surface of the motor plate 52. A pivot pin 54 is inserted through a pivot hole 47 in the carrier pivot extensions 46 of the top and bottom plates 38, 40, and a front of the top and bottom pivot flanges 48, 50 to pivotally engaged the steering knuckle 32 with the base tube 30. One end of the steering cylinder 36 is pivotally retained on an inside surface of the front plate 42 with a pivot pin 56. An opposing end of the steering cylinder 36 is pivotally engaged with a rear of the top pivot flange 48 and a middle pivot flange 58 with a pivot pin 60.

With reference to FIGS. 4-5, one end of the left extension cylinder 16 is retained by a first left cylinder pin 62 on a rear of the middle plate 20 at a right end. With reference to FIG. 7, an opposing end of the left extension cylinder 16 is retained on the front plate 42 with a second left cylinder pin 64, adjacent the carrier pivot extensions 46. With reference to FIG. 3, one end of the right extension cylinder 18 is attached to a first right cylinder pin 66 on a front of the middle plate 20 at a left end. An opposing end of the right extension cylinder 18 is attached to a second right cylinder pin 68 retained on the front plate 42 of the right axle device 14.

The extension cylinders 16, 18, the steering cylinders 36, the drive motors 34 are preferably hydraulic cylinders and hydraulic drive motors. The flow of the hydraulic fluid to the hydraulic cylinders 16, 18, 36 and the drive motors 34 are preferably operated with an electronic control system. With reference to FIG. 6, the left and right drive motors 34 are retained on the same centerline 70. The centerline 70 passes through a pivot hole 47 in the carrier pivot extension 46 and the drive motor 34. The offset of the pivot hole 47 of the carrier pivot extension 46 allows the left and right drive motors 34 to be on the same centerline 70.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An offset extendable axle with wheels on a common centerline for mobile equipment platforms, comprising:
    a base housing having a left axle opening on one end and a right axle opening on an opposing end;
    a left axle device having a left drive motor, said left drive motor is pivotally engaged with an end of said left axle device, said left axle device is retained in said left axle opening;
    a right axle device having a right drive motor, said right drive motor is pivotally engaged with an end of said right axle device, said right axle device is retained in said right axle opening, wherein said left drive motor and said right drive motor lie on said common centerline, said left axle device and said right axle device include a base tube, said base tube includes a top plate and a bottom plate, a carrier pivot extension extends frontward from an end of said bottom plate and said top plate, said common centerline passes through a pivot hole in said carrier pivot extension; and
    at least one extension device for extending and retracting said left axle device and said right axle device.

2. The offset extendable axle with wheels on a common centerline for mobile equipment platforms of claim 1, further comprising:
    a left steering cylinder for pivoting said left drive motor, a right steering cylinder for pivoting said right drive motor.

3. The offset extendable axle with wheels on a common centerline for mobile equipment platforms of claim 1 wherein:
    said at least one extension device is a left extension cylinder and a right extension cylinder.

4. The offset extendable axle with wheels on a common centerline for mobile equipment platforms of claim 1 wherein:
    a left wheel is retained on said left drive motor, a right wheel is retained on said right drive motor.

5. An offset extendable axle with wheels on a common centerline for mobile equipment platforms, comprising:
    a base housing having a left axle opening on one end and a right axle opening on an opposing end;
    a left axle device having a left drive motor, said left drive motor is pivotally engaged with an end of said left axle device, said left axle device is retained in said left axle opening;
    a right axle device having a right drive motor, said right drive motor is pivotally engaged with an end of said right axle device, said right axle device is retained in said right axle opening, said left axle device and said right axle device include a base tube, said base tube includes a top plate and a bottom plate, a carrier pivot extension extends frontward from an end of said bottom plate and said top plate, said common centerline passes through a pivot hole in said carrier pivot extension;
    a left extension device for extending and retracting said left axle device; and
    a right extension device for extending and retracting said right axle device.

6. The offset extendable axle with wheels on a common centerline for mobile equipment platforms of claim 5, further comprising:
    a left steering cylinder for pivoting said left drive motor, a right steering cylinder for pivoting said right drive motor.

7. The offset extendable axle with wheels on a common centerline for mobile equipment platforms of claim 5 wherein:
    said at least one extension device is a left extension cylinder and a right extension cylinder.

8. The offset extendable axle with wheels on a common centerline for mobile equipment platforms of claim 5 wherein:

a left wheel is retained on said left drive motor, a right wheel is retained on said right drive motor.

9. An offset extendable axle with wheels on a common centerline for mobile equipment platforms, comprising:

a base housing having a left axle opening on one end and a right axle opening on an opposing end;

a left axle device having a left base tube, a left steering knuckle and a left drive motor, said left steering knuckle is pivotally engaged with an end of said left base tube, said left drive motor is retained on said left steering knuckle, said left axle device is sized to be received by said left axle opening;

a right axle device having a right base tube, a right steering knuckle and a right drive motor, said right steering knuckle is pivotally engaged with an end of said right base tube, said right drive motor is retained on said right steering knuckle, said right axle device is sized to be received by said right axle opening, said left axle device and said right axle device include a base tube, said base tube includes a top plate and a bottom plate, a carrier pivot extension extends frontward from an end of said bottom plate and said top plate, said common centerline passes through a pivot hole in said carrier pivot extension;

a left extension device having one end retained in said base housing and an opposing end retained in said left axle device; and a right extension device having one end retained in said housing and an opposing end retained in said right axle device.

10. The offset extendable axle with wheels on a common centerline for mobile equipment platforms of claim 9, further comprising:

a left steering cylinder for pivoting said left drive motor, a right steering cylinder for pivoting said right drive motor.

11. The offset extendable axle with wheels on a common centerline for mobile equipment platforms of claim 9 wherein:

said at least one extension device is a left extension cylinder and a right extension cylinder.

12. The offset extendable axle with wheels on a common centerline for mobile equipment platforms of claim 9 wherein:

a left wheel is retained on said left drive motor, a right wheel is retained on said right drive motor.

* * * * *